United States Patent Office 3,263,460
Patented August 2, 1966

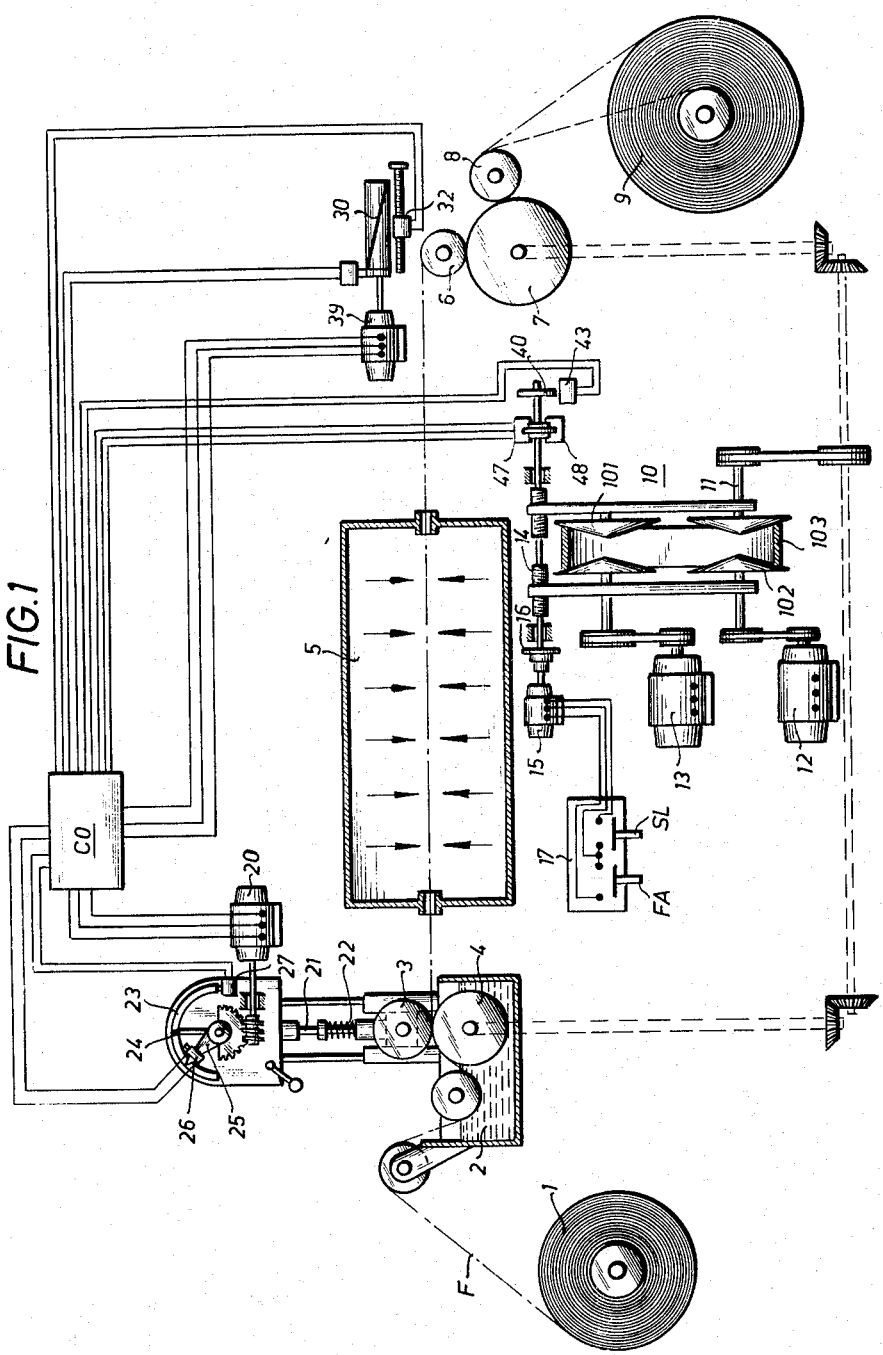

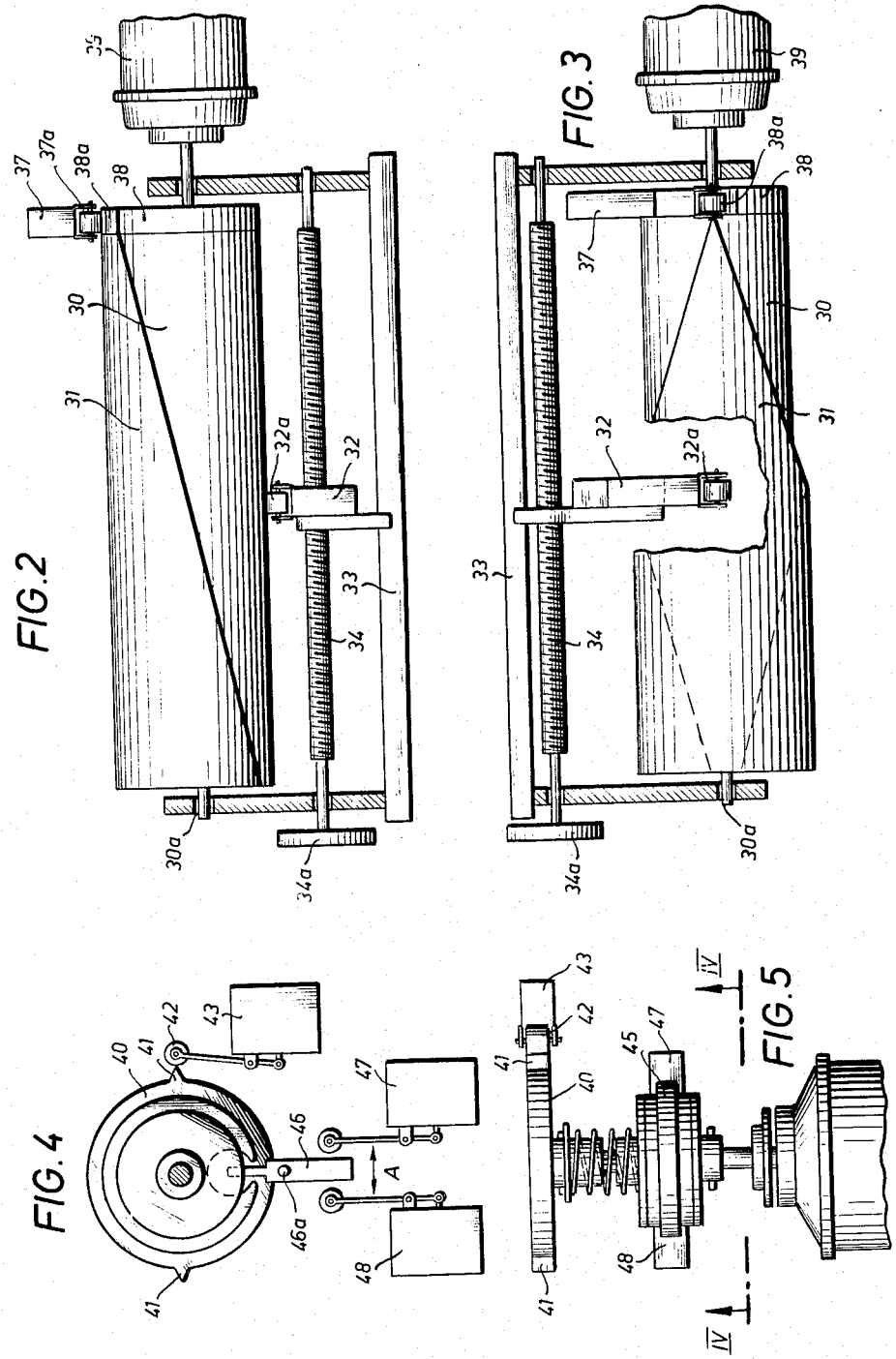

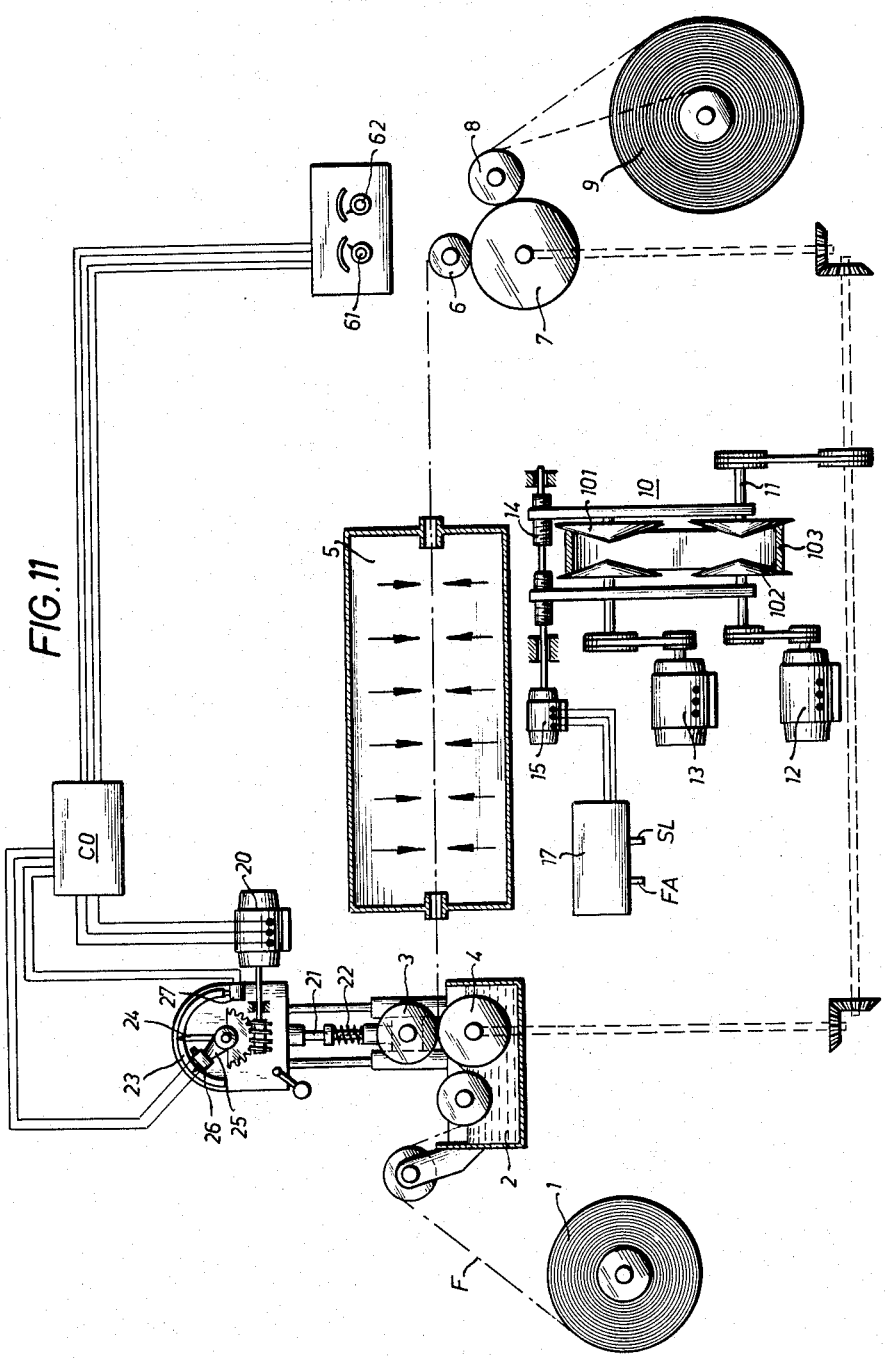

3,263,460
SYSTEM FOR THE CONTROL OF SQUEEZING PRESSURE APPLIED TO TRAVELLING WEB MATERIAL
Hans Kabelitz and Herbert Jennihsen, Monchen-Gladbach, Germany, assignors to Gebrüder Sucker, Monchen-Gladbach, Germany, a corporation of Germany
Filed Dec. 18, 1964, Ser. No. 419,493
Claims priority, application Germany, Dec. 21, 1963, S 88,847
10 Claims. (Cl. 68—253)

Our invention relates to control systems for varying the squeezing pressure applied to travelling web material or the like, for example with the aid of pinch rollers which press excessive size or other liquid from an array of warp threads or other textile material.

It is known to control the squeezing pressure between such rollers in dependence upon the travel speed of the material by adjusting the pressure in accordance with the displacement of a speed control member. This control member, if the advance of the material is controlled by a variable-speed electric motor, may be constituted, for example, by the electrical speed-control member connected in the motor circuit; and if the travel speed of the material is varied with the aid of a variable-speed transmission, the squeezing pressure may be made dependent upon the setting of the mechanical member whose positioning determines the transmission ratio.

It has been found that such variation of the squeezing pressure in dependence upon a speed control member, performed in the known manner, often fails to secure a satisfactory pressure adjustment and also leaves much to be desired in other respects. It happens that optimum squeezing performance is not achieved or not sufficiently approached because of hunting or overshooting tendencies, or that control system requires excessively complicated and trouble-susceptible auxiliaries for minimizing such tendencies.

It is an object of our invention to provide a travel-responsive squeeze-pressure control system for web and similar material that affords a more accurate adjustment of the desired pressure with the aid of relatively simple equipment of reliable performance.

Another object of the invention is to make such a system capable of rapidly adapting itself to large differences in squeezing pressure, such as are required by extreme changes in speed between normal travel and creeping or threading travel of the material.

To achieve these, as well as the more specific objects apparent from the following, and in accordance with a feature of our invention, we provide a travel-responsive squeeze-pressure control system with a pulse generating device which operates in accordance with the travel speed of the material and issues discrete control pulses to the pressure control means of the squeezing device. Thus, we change the squeezing pressure under the effect of intermittent pulses or power surges spaced from each other by a pause, so that the pressure change caused by each individual pulse will exert its full effect before another pulse, if needed, is applied, thus affording a more accurate adjustment of the proper squeezing pressure with a minimum of control actions.

According to another feature of our invention, such a system is further improved by providing the above-mentioned pulse generating device with means which permit varying the characteristics of the generated pulses, for example the active pulse length, the duration of the intermediate pauses or the pulse-to-pause ratio, in dependence upon the difference of the squeezing pressures that are to be effective at creeping speed and normal travel speed respectively of the material. It has been found that for preserving optimal squeezing pressure, this pressure must not increase continuously with an increase in travel speed but at considerably higher rate. If a very large difference in squeezing pressure is to exist between creeping speed and normal speed of travel, then the pulse lengths adjusted for example for a small pressure difference are no longer sufficient along the entire displacement path or the entire duration of the displacement travel of the speed control member, to make the desired squeezing pressure effective at the normal travel speed of the material. By virtue of the fact that, according to the feature of the invention last mentioned, a characteristic parameter of the generated pulses, for example the pulse length, can be increased when the pressure difference between creeping and normal travel is very large, it may be achieved that, even with large pressure differences, the squeezing pressure is adjusted to the desired respective values within the interval of time required for the change in travel speed of the material.

The above-mentioned and other objects, advantages and features of our invention, said features being set forth with particularity in the claims annexed hereto, will be apparent from, and will be mentioned in, the following in conjunction with control systems according to the invention illustrated by way of example on the accompanying drawings in which:

FIG. 1 shows schematically a slasher for applying size to an array of warp threads.

FIG. 2 shows schematically a front view and FIG. 3 a lateral elevation of a pulse generating device which forms part of the slasher control system according to FIG. 1.

FIG. 4 shows more in detail a cam-controlled switch assembly which also forms part of the system shown in FIG. 1; and FIG. 5 is a plan view of the same assembly, the line IV—IV in FIG. 5 indicating the viewing and sectional plane for FIG. 4.

FIG. 11 illustrates schematically still another embodiment of a slasher control system.

The same reference characters are used in the various illustrations for denoting corresponding components respectively.

Figure 10:
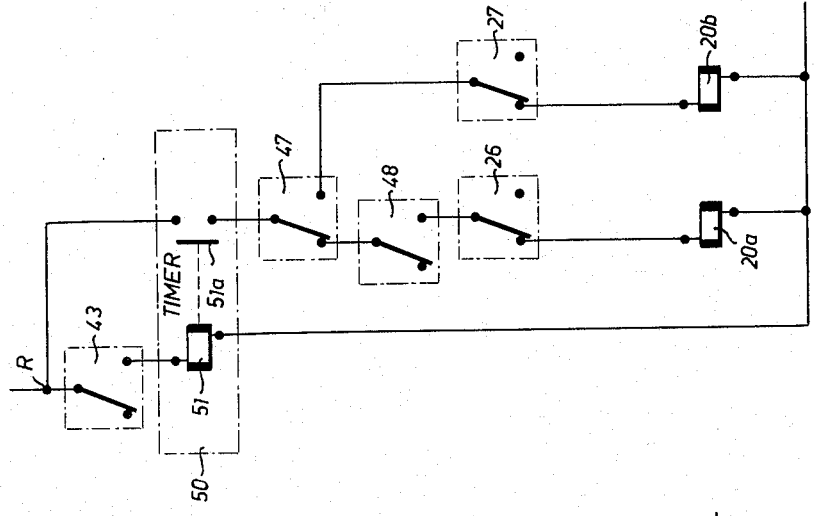
FIG. 10 is a schematic electric circuit diagram relating to the control system of FIGS. 7 to 9.

According to FIG. 1, an array of warp threads F coming from a warp beam 1 is guided by rollers through a size trough 2. The excess of size liquid is squeezed off between pinch or squeegee rollers 3 and 4 of which the lower one is immersed in the size liquid and the upper one is pressed against the lower roller under adjustable pressure. From the squeeze rollers 3, 4 the warp passes through a dryer 5 and between pull-off rollers 6, 7, 8 to be wound upon a beam 9. The squeeze roller 4 and the pull-off roller 7 are driven through suitable transmissions and gears, indicated by broken lines, from the output shaft 11 of a continuously adjustable variable-speed transmission. The transmission is selectively driven from a motor 12 for advancing the warp at creeping speed, or is driven from a motor 13 for operation at normal speed.

The variable-speed transmission 10 is of conventional type. It comprises two conical sheaves 101, 102 and an endless belt 103 trained about the two sheaves. The two lateral parts of each sheave are displaceable toward and away from each other in the axial direction. For example, when the two portions of the upper sheave 101 are spaced relatively far from each other, the corresponding two portions of the lower sheave 102 are relatively close to each other, so that the effective diameter of sheave 101 is larger than that of sheave 102. By thus displacing the sheave portions in proper relation to each other, the transmission ratio can be continuously varied. This is done by means of a spindle 14 which has a left-hand screw thread and a separate right-hand screw thread in engagement with respective two members of the transmission 10 so that, when the spindle 14 is revolved about its own axis, the above-described change in transmission ratio is effected in one or the other sense depending upon the rotational direction of the spindle 14. The spindle is driven from a motor 15 through a frictional slip clutch 16. The motor 15 is controlled by a contactor or the like control means schematically represented at 17, which may be mounted on the control panel or in the control cabinet for the beaming or sizing machine.

The squeezing pressure between the rollers 3 and 4 is controlled by an electric motor 20 in driving connection with the vertical rod 21. A spring 22, seated on rod 21, has one end in abutment with the roller 3 and the other end in abutment with a shoulder ring rigidly secured to the rod 21. When the motor 20 moves the rod in the downward direction, the spring pressure imposed upon the roller 3 is increased, thus increasing the squeezing pressure between rollers 3 and 4. The motor 20 simultaneously displaces a pilot pointer 24 relative to a fixed scale of indicia. This pointer directly indicates the effective squeezing pressure. Another pointer 25, rotatable in coaxial relation to the pilot pointer 24 relative to the same scale 23, serves to indicate the datum value for creeping speed. Pointer 25 serves to make certain that, when the machine is switched to creeping speed, the squeezing pressure between rollers 3 and 4, which then becomes reduced in accordance with the reduced travel speed, will not drop below the adjusted datum value. The creeping-speed pointer 25 as well as the scale 23 are provided with limit switches 26 and 27 respectively which are connected with the control unit CO (more fully described below with reference to FIG. 6) and which control this unit to interrupt the circuit of the motor 20 whenever the actual squeezing pressure reaches the limit values, thus preventing a further change in pressure between the rollers 3 and 4.

According to the invention, the displacing motion of the speed control member, which in the present embodiment is constituted by the spindle 14 of the variable-speed transmission 10, is employed for controlling a pulse generator which, in turn, serves to control the squeezing pressure between the rollers 3 and 4 by correspondingly acting upon the control motor 20. Such a pulse generator may be mounted directly upon the speed control spindle 14 or may be directly coupled therewith. However, according to another feature of our invention, we prefer providing the pulse generating device with its own electric drive motor as will more fully appear from the following.

As mentioned, it is of particular advantage to provide a pulse generating device which permits varying the pulse characteristic in dependence upon the pressure difference required at creeping speed and normal speed respectively. The pulse generating device schematically indicated in FIG. 1 and more fully shown in FIGS. 2 and 3 embodies this preferred feature.

The devcie comprises a rotatably mounted drum 30 (FIGS. 1, 2, 3) whose periphery is covered by a contact or cam member 31 whose edges extend at an inclination to the generatrix directions of the drum peripheral surface or, in other words, are askew to the drum axis, so that the drum periphery covered by the cam member 31 increases from one toward the other end of the drum. In the embodiment shown, the surface of cam 31 (FIG. 2) increases in the direction of the drum shaft 30a toward the left end. A switch 32, actuable by a roller 32a, is displaceable along the drum, the roller 32 being in engagement with the drum periphery so that the switch 32 (FIGS. 2, 3, 6) is closed whenever the roller 32a is engaged by the cam member 31, but is open when the roller 32a engages the remaining circumferential portion of the drum 30. The switch 32 is in threaded engagement with a screw spindle 34 which can be rotated by means of a spur gear 34a to shift the switch 32 to the left or right (FIGS. 2, 3) in parallel relation to the drum shaft 30a.

As explained, the pulse generating device is to issue pulses whenever the speed control spindle 14 (FIG. 1) is being actuated to change the transmission ratio of the feed drive. As also mentioned, the shaft 30a of the drum 30 may be connected directly with the control spindle 14 to serve the just-mentioned purpose. In this case, the drum 30 would perform a given number of rotations for each rotation of the control spindle 14 depending upon the transmission ratio between the spindle and the drum shaft. During each individual rotation of drum 30, the cam member 31 would then cause the roller 32a to close and thereafter open the switch 32, the closing period of the switch 32 being dependent upon the particular point along the drum 30 where the switch 32 happens to be located. It will be seen from FIG. 2 that the switch 32 will remain closed a longer period of time when the switch 32 is shifted farther toward the left. When the switch 32 is displaced to the right, the closing period of the switch is shortened and the duration of the intermediate pauses is prolonged.

With the above-mentioned mechanical connection of the drum shaft 30a with the control spindle 14, it may happen that the control spindle 14 will stop just at a moment when the roller 32a has run onto the cam member 31 so that switch 32 is closed. If spindle 14 could be stopped under such conditions, the switch 32 would issue a continuous current and thus keep the pressure control motor 20 (FIG. 1) in continuous operation so that the squeezing pressure increases until the datum-value pointer 24 reaches the limit switch 27 and then stops the motor 20. This defeats the purpose of controlling the pressure in dependence upon the travel speed of the material F.

Consequently, care should be taken that, when the speed control spindle 14 is being actuated, the pulse generating device will always issue full pulses only and the drum shaft 30a will stop only at a moment when the switch 32 is open. To achieve this result, the illustrated embodiment has the drum shaft 30a not directly connected with the speed control spindle 14 but separately driven from a motor 39 under control by a cam switch assembly connected with the speed control spindle 14. This auxiliary cam-switch assembly will be described presently with reference to FIGS. 4 and 5.

Figure 6:
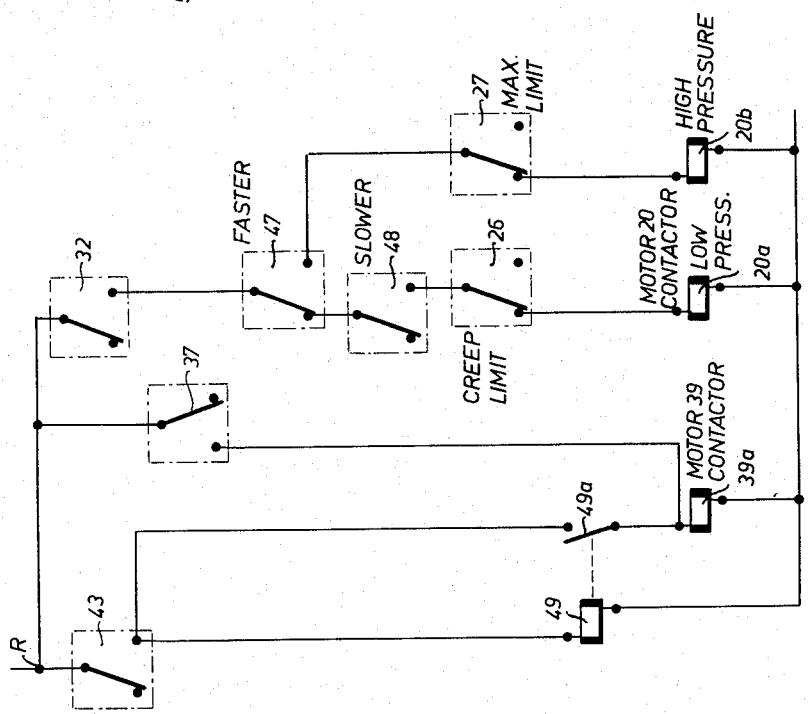
FIG. 6 is a schematic electrical circuit diagram relating to the control system of FIGS. 1 to 5.

The assembly comprises a cam disc firmly connected with the speed control spindle 14 (FIG. 1) to rotate together therewith. The cam 40 has lobes 41 (FIG. 4) acting upon a roller 42 which operates a switch 43 (FIGS. 1, 4, 6). The switch 43 controls a wiper relay 49 (FIG. 6) whose contact 49a energizes a contactor 39a which, in turn, energizes the drive motor 39 of the pulse generator drum 30 to commence rotating. The connection of the contactor 39a with the motor 39 is not illustrated because it is universally known and not essential to the invention. The shaft 30a of drum 30 carries a cam 38 (FIGS. 2, 3) which has a lobe controlling the actuating roller 37a of a switch 37 (FIGS. 2, 3, 6) which closes a holding circuit for the motor contactor 39 and thus keeps the drum-drive motor 39 running independently of the subsequent opening of the switch 43, until the roller 37a is engaged by the cam lobe 38a. This continued holding of the motor contactor 39a is necessary because the wiper relay 49 issues a single pulse as its contact arm wipes over beyond a fixed contact (one-shot relay). Consequently, the relay 49 only initiates the operation of the contactor 39a and hence the rotation of the drum 30 which immediately thereafter causes closing of the cam-controlled contact 37 (FIGS. 2, 6). Only when the drum 30 has completed a full rotation, is the contact 37 opened by the cam lobe 38a, so that the current supply to the drum drive motor 39 is interrupted. It will be recognized that at this moment the roller 32a (FIGS. 2, 3) of switch 32 (FIGS. 1, 2, 3, 6) is located on the portion of drum 30 which does not cause closing of switch 32, so that when the roller 37a of switch 37 runs onto the lobe 38a, the supply of current to the pressure control motor 20 is interrupted.

This will be more fully apparent from the description of FIG. 6 given in a later place, where it appears that when the switch 32 is open, the contactors 20a and 20b which control the motor 20 for movement toward lower and higher pressure respectively, cannot operate. If accidentally the roller 42 has stopped on the lobe 41, thus keeping the cam switch 43 closed (FIG. 6), the wiper relay 49 prevents the motor contactor 39 from being again switched on, because the circuit of this contactor remains interrupted until the speed control spindle 14 is again rotated and the roller 42 thus moved away from the lobe 41 to open the cam switch 43. Only then can the wiper relay 49 drop off and become ready for another one-shot operation.

As shown in FIGS. 4 and 5, the cam disc 40 is connected through a spring-biased friction disc 45 with a direction-responsive switch 46 which is journalled on a pivot pin 46a and, depending upon the rotational direction of the cam 40, is turned toward the left or right, this being indicated by a double-headed arrow A. The switch 46 thus actuates either a switch 47 or a switch 48 (FIGS. 4, 5, 6). Since the direction of rotation of cam 40 depends upon the rotational direction of the speed control spindle 14 (FIG. 1), the response of the actuating member 46 is indicative of whether the variable-speed transmission is being adjusted toward reduction or toward increase in travelling speed of the warp material F. This adjustment is controlled by a selectively actuable switching device which forms part of the control unit 17 (FIG. 1) preferably mounted on the control panel or in the control cabinet for the machine and which is schematically represented in FIG. 1 by a "faster" switch FA and a "slower" switch SL, the illustration being purely schematic, it being understood that the control circuits of motor 15 may also contain conventional control relays and contactors as may be desired. Depending upon whether the travel speed of the material F is being increased or reduced, the pressure control motor 20 (FIG. 1) must run in one or the other direction to correspondingly increase or reduce the squeezing pressure between the rollers 3 and 4.

If desired, the pulses coming from the pulse-generator switch 32 (FIGS. 2, 3, 6) serving for controlling the pressure control motor 20, may be passed through the "faster-slower" switching device in order to thereby determine the rotational direction of motor 20. This, however, would have the consequence that the control pulses are supplied to the motor 20 only as long as the "faster-slower" switch device is being actuated. Consequently it may then happen that the supply of current from switch 32 (FIG. 6) to the contactors 20a, 20b of the pressure control motor 20 becomes interrupted before the completion of an active pulse. Since then the motor 20 would stop prematurely, the squeezing pressure might be insufficiently adjusted.

However, the provision of the direction-responsive switching device 46, 47, 48 (FIGS. 4, 5) has the advantage that the motor 20 will be always controlled by a full number of complete pulses because these pulses do not pass through the "faster-slower" switch device but through the two switches 47 and 48 (FIG. 6). For example, assume that the cam 40 is being rotated clockwise. Then the actuating member 46 (FIG. 4) swings to the right and actuates the switch 47, and this switch remains closed after the cam 40 has stopped rotating. Thereafter, the switch 47 is opened only when the cam 40 commences rotating in the opposite direction, namely counter-clockwise, because in this case the actuating member 46 is turned to the opposite side to open the switch 47 and then close the switch 48.

The electrical circuitry of the system shown in FIGS. 1 to 5 will be further described with reference to FIG. 6. One pole R of an electrical power supply line is connected through the switch 32 with the switch 47 which has two positions and, in one of them, is connected with the switch 48. When closed, the switch 48 connects pole R through the creep limit switch 26 with a contactor 20a whose other end is connected to the other pole of the current supply line. The contactor 20a, when energized, controls the motor 20 to operate in the direction required to reduce the squeezing pressure between the rollers 3 and 4. The second selector contact of switch 47 is connected through the normally closed maximum limit switch 27 with another contactor 20b whose other terminal is connected to the other pole. When energized, the contactor 20b controls the motor 20 to run in the direction required to increase the squeezing pressure.

The switch 47 is actuated to shift from the illustrated to the other position when the travel speed is increased. The switch 48 is actuated when the travel speed is reduced. According to FIG. 4, each of switches 47 and 48 normally is in the inactive position, this being the one illustrated in FIG. 6. As explained, the creep limit switch 26 opens when the squeezing pressure reaches the low value that is to obtain during creeping travel, whereas the maximum limit switch 27 is opened when the squeezing pressure reaches a predetermined maximal value.

As mentioned, the switch 32 of the pulse generating device can close only when the drum 30 is rotating. For this purpose, another lead extends from pole R of the supply line through the switch 43 (FIGS. 1, 4, 5, 6) to the wiper relay 49 whose contacts 49a, when temporarily closed, energizes the control contactor 39a for the motor 39. The wiper relay 49 is so adjusted that the contact 49a remains closed until the roller 37a (FIGS. 2, 3) of switch 37 has rolled off the cam lobe 38a and thus has closed the switch 37 (FIGS. 2, 3, 6). After the wiper relay contact 49 has opened, the contactor 39a remains energized through switch 37 until the drum 30 has completed a full rotation and the roller 37a has run onto the lobe 38a, thus opening the switch 37.

The system described in the foregoing with reference to FIGS. 1 to 6 affords an extremely precise adjustment of the squeezing pressure in dependence upon the displacing movement of the speed control member. For many purposes, however, a system according to the invention can be simplified considerably, for example as exemplified by the one shown in FIGS. 7 to 10 and described presently.

The system according to FIGS. 7 to 10 is largely similar to the one already described and also comprises a pulse generating device. In this case, however, the latter device is simplified by consisting essentially of a cam switch assembly connected with the speed control member, and a timing relay of adjustable timing period is provided for controlling the switching-on period of a circuit controlled by a switch of the assembly.

Figure 7:
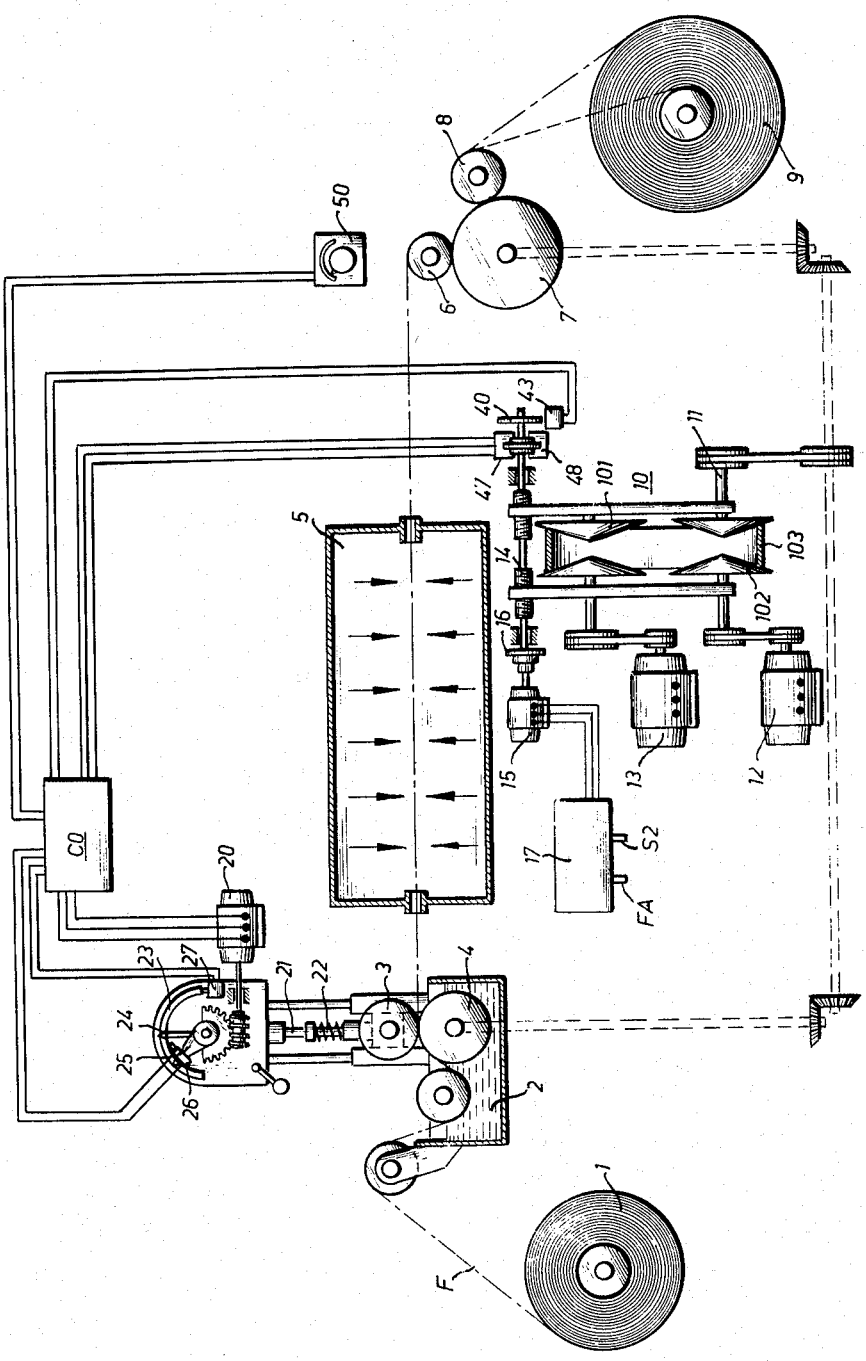
FIG. 7 illustrates schematically another embodiment of a slasher control system.
Figure 8:
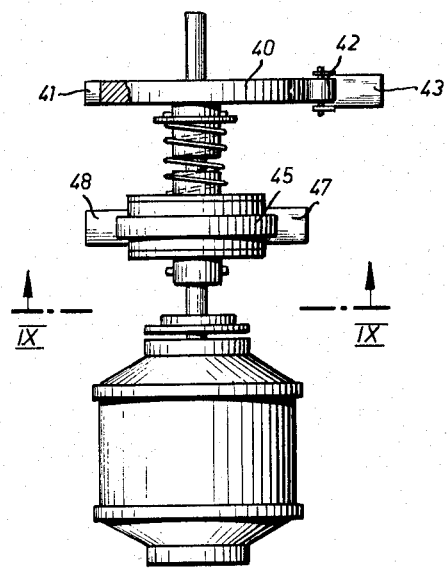
FIG. 8 is a plan view and FIG. 9 a lateral elevation of a cam-controlled switch assembly which forms part of the system shown in FIG. 7, the line IX—IX in FIG. 8 indicating the viewing plane of FIG. 9.
Figure 9:
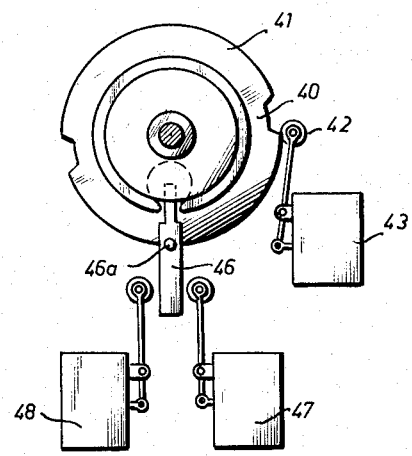

More in detail, the slasher control system shown in FIG. 7 is similar to the one described with reference to FIG. 1, and also permits varying the travel speed of the warp material with the aid of a variable-speed transmission whose speed control spindle 14 carries a cam disc 40 with an appertaining cam-controlled switch 43, as well as a direction sensing switch 46, 47, 48 (FIGS. 7, 8, 9). As will be seen from FIGS. 8 and 9, the cam switch assembly connected with the speed control spindle 14 corresponds largely to that of FIGS. 4 and 5. An essential difference, however, is the fact that the lobe 41 of cam 40 in the embodiment according to FIGS. 1 to 6 is very short, whereas it is very long in the embodiment according to FIGS. 7 to 10. It will also be noted from a comparison of FIGS. 1 and 7, that in the system of FIG. 7 the drum 30 with the accessory component (FIG. 1) is eliminated. In lieu thereof, the machine is equipped with a timer 50 with an adjusting knob (FIG. 7) for setting the switching-on periods of an appertaining timing relay 51 (FIG. 10).

The operation of the system according to FIG. 7 will be explained with reference to the schematic circuit diagram shown in FIG. 10. It will be recognized that this diagram corresponds to the right-hand portion of the one shown in FIG. 6, except that the switch 32 of FIG. 6 is substituted by the contact 51a of the timing relay 51. In the system according to FIG. 10 there is no motor 39 and consequently no contactor 39a, nor a wiper relay 49.

The timing relay 51 is switched on by the cam-controlled switch 43 and keeps its contact 51a closed for a period of time predetermined by the chosen setting of the timer adjusting knob seen at 50 in FIG. 7. When the speed control spindle 14 is being rotated, the cam 40 will also rotate. Whenever the roller 42 runs upon one of the lobes, the circuit of the timing relay 51 is closed so that the relay closes its contact 51a which thereafter opens only upon elapse of the period for which the timer 50 is set. As long as contact 51a remains closed, one of the contactors 20a, 20b is selectively energized to operate the motor 20 in one or the other direction, depending upon the actuation of the interposed direction sensing switches 47, 48 and the limit switches 26, 27.

Systems according to the invention as exemplified by the embodiments described above, may be employed with any kind of speed control members, as well as in conjunction with any type of speed-change transmissions or variable-speed drives. The reason for this universal applicability is the fact that, regardless of the period of time during which the "faster-slower" switch or contactor in control unit (17 in FIG. 1) is being actuated for causing the control motor of the drive to increase or decrease the speed, the control pulses supplied to the control motor 10 for varying the squeezing pressure are always individually the same or are always in accordance with a pre-set pulse characteristic as long as the speed control member, such as represented by the above-described control spindle 14, is actually kept in motion.

There are cases, however, where the controlling motion of the spindle 14, or of an equivalent speed control member, does not always last as long as the period of time during which the "faster-slower" switch or contactor is being actuated. Thus, in the system of FIG. 1 a slip clutch 16 is interposed between the speed control spindle 14 and the appertaining drive motor 15 for preventing the motor 15 from being overloaded when the adjustment of spindle 14 arrives in a limit position; and it may therefore happen that the "faster-slower" switch or contactor is still being actuated although the control spindle 14 can no longer continue rotating. The motor 15 then acts only upon the slip clutch 16.

Figure 12:
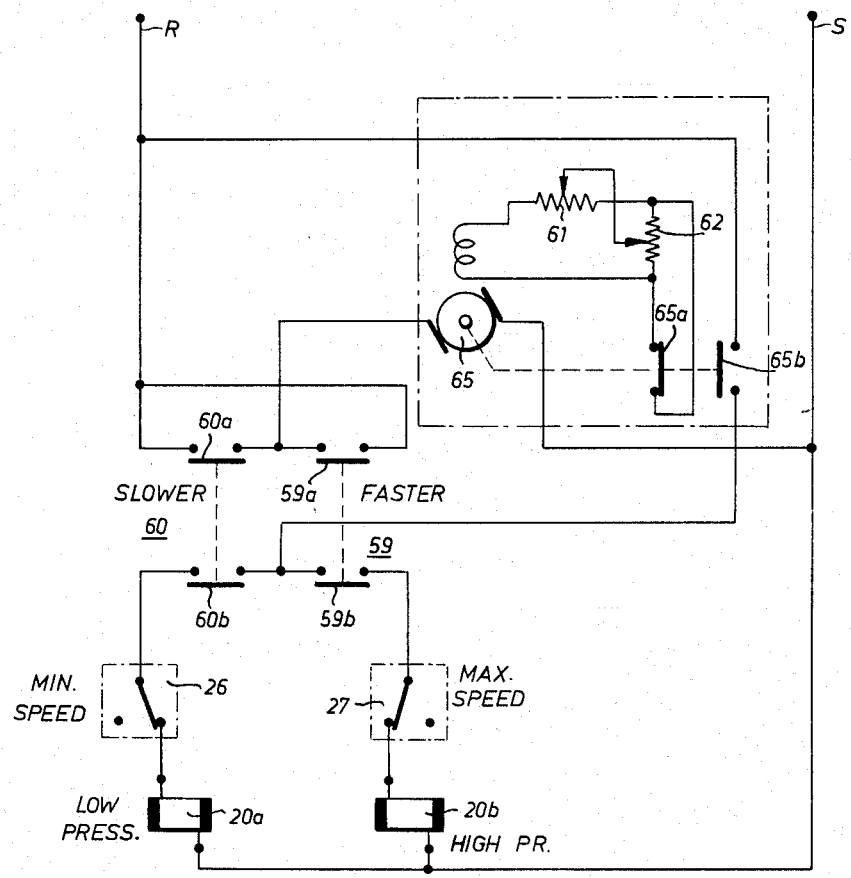
FIG. 12 is a corresponding electrical circuit diagram.

On the other hand, there are speed control members which do not require the provision of a slip clutch but are equipped with limit switches for disconnecting and stopping the appertaining drive motor. In the latter case, it is impossible that the "faster-slower" contacts are still being actuated and that the motor keeps running when the speed control member is no longed capable of performing a controlling displacement motion. Under such conditions, a system according to the invention may be further simplified, as will be explained with reference to the example illustrated in FIGS. 11 and 12.

FIG. 11 largely corresponds to FIGS. 1 and 7, except that the slip clutch (16 in FIGS. 1, 7) in the driving connection of the speed control spindle 14 is omitted. The system is further simplified in that no pulse generating device is directly connected with the speed control spindle 14. That is, the pulse generator which controls the motor 20 for varying the squeezing pressure between rollers 3 and 4, is no longer controlled in direct dependence upon the displacing motion of the control member 14, but is indirectly controlled in dependence upon the switching-on duration of the control motor 15. As explained with reference to FIG. 1, the control motor 15 is placed in operation by a "faster-slower" switch or contactor in control unit 17 and keeps running as long as one of the switch contacts in this unit is being actuated. Due to the absence of a slip clutch, the control spindle 14 can rotate only as long as the switching unit or contactor "faster-slower" in unit 17 is being kept in switched-on condition.

If desired, the pulse generator may be connected with the speed control spindle 14, for example in the manner apparent from FIGS. 8 and 9, except that now the direction-responsive switches 46, 47, 48 may be substituted by respective contacts of the "faster-slower" switching device. However, a considerable simplification is achieved by employing an electrical pulse generator as schematically exemplified in FIG. 12. The electrical pulse generator comprises a motor 65, for example a Ferraris mechanism, which is switched on whenever the "faster" switch 59 or the "slower" switch 60 is kept actuated. It will be understood that instead of the schematically illustrated Ferraris mechanism, any other small motor, such as a midget motor with a permanent-magnet armature, may be used.

The motor 65 periodically closes contacts 65a and 65b during the period of time in which the motor remains energized. The contact 65b substitutes the switch 32 or 51a according to FIGS. 6 or 10. Whenever the contact 65b is closed, it energizes one of the contactors 20a, 20b which operate the motor 20 in one or the other direction depending upon which of the switches 59 and 60 is closed at a time, and as long as the speed limit switch 26 or 27 remains closed. Assume that the "faster" switch 59 is switched on so that contacts 59a and 59b are closed, whereas contacts 60a and 60b are open. The closing of contact 59a causes the motor 65 to rotate so that the pulse contact 65b is closed once for each rotation and the circuit of contactor 20b is closed through switch contact 59b and limit switch 27' This energizes the pressure control motor 20 (FIG. 11) in the sense required for increasing the squeezing pressure. The pulse length, or the pause between the pulses, in this embodiment is dependent upon the rotating speed of the motor 65. This speed is controllable by means of two variable resistors 61 and 62 which may likewise be mounted on the control panel or in the control cabinet of the beaming machine. It is thus also possible, in this particularly simple embodiment, to modify the characteristic parameters of the generated pulses in dependence upon the pressure difference between creeping speed and normal speed of travel.

Upon a study of this disclosure it will be obvious to those skilled in the art, that systems according to our invention may be modified in various other respects and may be given embodiments different from those illustrated and described herein, without departing from the essential features of our invention and within the scope of the claims annexed hereto.

We claim:

1. A system for the control of squeezing pressure applied to traveling textile material, comprising means defining a travel path for material, a variable-speed drive for moving the material along said path, speed control means connected with said drive for varying the travel speed, a squeezing device engageable with the material on said path and having pressure adjusting means for varying the squeezing pressure, pulse generating means in controlling connection with said pressure adjusting means and responsively connected to said speed control means for effecting pulsewise variation of the squeezing pressure in dependence upon the travel speed of the material.

2. In a system for speed-responsive control of squeezing pressure applied to travelling material according to claim 1, said travel-speed control means comprising selective means for setting a normal operating speed and a creeping speed respectively, and said pulse generating means having a pulse-to-pause ratio variable in dependence upon the squeezing-pressure difference between said respective normal and creeping speeds.

3. A system for the control of squeezing pressure applied to travelling textile material, comprising means defining a travel path for material, a variable-speed drive for moving the material along said path, speed control means connected with said drive and having a movable control member for varying the travel speed in accordance with the positioning of said member, a squeezing device engageable with the material on said path and having a reversible control motor for varying the squeezing pressure, pulse generating means having an electric pulse contact device connected to said speed control member to issue pulses in accordance with positional change of said member, and circuit means connecting said pulse contact device with said pressure control motor for operating said motor to vary the squeezing pressure in dependence upon the travel speed of the material.

4. In a squeeze-pressure control system according to claim 3, said pulse contact device comprising cam means movable in dependence upon motion of said speed control member, and electric pulse contact means actuable by said cam means to intermittently issue pulses in accordance with the amount of said motion.

5. In a squeeze-pressure control system according to claim 3, said circuit means comprising electric contact means having a timed closing period for controlling the individual energizing interval of said pressure control motor initiated by each pulse from said pulse contactor and adjusting means for varying the length of said closing period.

6. In a squeeze-pressure control system according to claim 3, said pulse contact device comprising a rotatable drum and a switch contact displaceable along said drum, said drum having on the drum peripheral surface an actuator member with an edge extending in substantially skewed relation to the drum axis so that said member covers a drum surface area which increases from one to the other axial end of said drum, whereby the pulse-duration-to-pause ratio depends upon the positioning of said switch contact lengthwise of said drum.

7. A squeeze-pressure control system according to claim 6, comprising full-rotation drive means connected with said drum for rotating it a full number of rotations upon each release of said drive means, and pulse switch means having a rotatable cam mechanically joined with said speed control member to move conjointly therewith, said switch means having a pulse contact controlled by said cam and electrically connected with said drive means for releasing said drive means.

8. In a squeeze-pressure control system according to claim 3, said circuit means between said pulse contact device and said pressure control motor comprising an adjustable timing relay having a timed closing period for controlling the individual energizing interval of said pressure control motor initiated by each pulse from said pulse contactor.

9. In a squeeze-pressure control system according to claim 3, said circuit means between said pulse contact device and said pressure control motor comprising two alternatively operable circuits for operating said control motor in forward and reverse directions respectively, and selector means connected with said two circuits and responsive to acceleration and deceleration setting of said variable speed drive, whereby said pressure control motor is caused to increase and decrease the squeezing pressure with increasing and decreasing travel speed respectively of the material.

10. In a squeeze-pressure control system according to claim 9, said pulse contact device comprising rotatable contactor means connected with said speed control member and rotatable in opposite directions with movement of said control member toward faster and slower travel speed respectively of said variable-speed drive, and said selector means being connected to said rotatable contactor means and responsive to the rotational direction of said contactor means.

References Cited by the Examiner

UNITED STATES PATENTS

| | | | |
|---|---|---|---|
| 1,925,866 | 9/1933 | Drake | 100—47 |
| 2,637,659 | 5/1953 | Miller | 118—33 X |
| 2,900,951 | 8/1959 | Kabelitz | 118—112 |
| 3,084,314 | 4/1963 | Ziffer | 100—47 X |

LOUIS O. MAASSEL, *Primary Examiner.*